United States Patent
Hart et al.

(10) Patent No.: US 8,870,703 B2
(45) Date of Patent: Oct. 28, 2014

(54) TRANSMISSION WITH BAND CLUTCH

(71) Applicant: GM Global Technology Operations LLC, Detroit, MI (US)

(72) Inventors: James M. Hart, Belleville, MI (US); Daryl A. Wilton, Macomb, MI (US); Edward W. Mellet, Rochester Hills, MI (US); Elizabeth I. Wooden, Farmington Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 169 days.

(21) Appl. No.: 13/680,911

(22) Filed: Nov. 19, 2012

(65) Prior Publication Data
US 2014/0141926 A1    May 22, 2014

(51) Int. Cl.
*F16D 49/12*    (2006.01)
*F16D 49/16*    (2006.01)
*F16D 51/00*    (2006.01)
*F16D 67/00*    (2006.01)
*F16H 3/62*    (2006.01)

(52) U.S. Cl.
CPC .................................... *F16H 3/62* (2013.01)
USPC ........... 475/275; 475/277; 475/288; 475/311; 188/77 W; 188/77 R; 188/151 R; 192/3.52; 192/215

(58) Field of Classification Search
CPC .................................. F16D 49/12; F16D 49/08
USPC ...... 475/275–292, 311–328; 188/77 R, 77 W, 188/151 R; 192/3.52, 215
See application file for complete search history.

(56) References Cited

U.S. PATENT DOCUMENTS

| | | | | |
|---|---|---|---|---|
| 2,253,740 | A * | 8/1941 | Van Hook | 242/421.9 |
| 3,923,126 | A * | 12/1975 | Bidanset | 188/77 W |
| 4,346,622 | A * | 8/1982 | Pierce | 475/56 |
| 5,427,217 | A * | 6/1995 | Patridge | 192/13 R |
| 8,079,569 | B2 * | 12/2011 | Lesko | 254/344 |
| 8,627,572 | B2 * | 1/2014 | Martinsson et al. | 30/383 |

* cited by examiner

*Primary Examiner* — Tisha Lewis (57) ABSTRACT

A transmission is provided having a housing, a plurality of planetary gear sets, a structural member, a sprocket member, an annular drum, a band, and an actuator. The sprocket member is rotationally supported by the structural member. The annular drum is adjacent the structural member and is continuously rotationally coupled with a member of the one of the plurality of planetary gear sets. The band circumscribes the annular drum and includes at least a first position and a second position. In the first position the band is substantially separated from the drum and in the second position the band contacts the drum. The actuator selectively positions the band between at least the first position and the second position to transfer torque between the structural member and the annular drum.

22 Claims, 6 Drawing Sheets

| GEAR STATE | GEAR RATIO | RATIO STEP | TORQUE TRANSMITTING ELEMENTS ||||||
|---|---|---|---|---|---|---|---|---|
| | | | 132 | 130 | 26 | 136 | 128 | 126 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||| 
|---|---|---|---|---|---|---|---|---|---|
| | | | 234 | 232 | 26 | 238 | 228 | 226 | 230 |
| REV | -2.943 | | X | | | | | X | |
| N | | -0.64 | | | | | | | |
| 1ST | 4.584 | | X | | | X | | | |
| 2ND | 2.964 | 1.55 | | X | | X | | | |
| 3RD | 2.413 | 1.23 | | | | X | | | X |
| 4TH | 1.912 | 1.26 | | | | X | | X | |
| 5TH | 1.446 | 1.32 | | | | X | X | | |
| 6TH | 1.000 | 1.45 | | | | | | X | X |
| 7TH | 0.836 | 1.20 | X | | | X | | | |
| 8TH | 0.746 | 1.12 | | X | | | | X | |
| 9TH | 0.599 | 1.25 | | | | | X | X | |
| 10TH | 0.541 | 1.11 | | X | | X | | | |
| 11TH | 0.491 | 1.10 | | | | X | | X | |
| 12TH | 0.440 | 1.12 | | | | X | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||||
|---|---|---|---|---|---|---|---|---|---|
| | | | 334 | 332 | 26 | 338 | 328 | 326 | 330 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.902 | 1.11 | X | | | X | | | |
| 8TH | 0.746 | 1.21 | | X | | | X | | |
| 9TH | 0.632 | 1.18 | | | | | X | X | |
| 10TH | 0.583 | 1.08 | | X | | X | | | |
| 11TH | 0.526 | 1.11 | | | | X | | X | |
| 12TH | 0.475 | 1.11 | | | | X | | | X |

X = ON - ENGAGED CARRYING TORQUE
O = ON - ENGAGED NOT CARRYING TORQUE

FIG. 11

TRANSMISSION WITH BAND CLUTCH

FIELD

The invention relates generally to a multiple speed transmission having a plurality of planetary gear sets and a plurality of torque transmitting devices and more particularly to a transmission having a band clutch as one of a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. Friction clutches often include multiple plates that engage each other to transfer torque. Plate friction clutches are typically closely spaced and may have drag forces between the plates when the clutch is disengaged. The drag forces in plate friction clutches increase spin losses and reduce the efficiency of the transmission. Band clutches are an alternative to plate clutches, but the transmission case or bellhousing to which they may be mounted are typically aluminum or some other material having undesirable stress concentration tolerance. The need for new and improved transmission configurations which exhibit improved performance and efficiency is essentially constant. Accordingly, there is a need for a multiple speed transmission that incorporates a clutch having improved efficiency and performance.

SUMMARY

A transmission is provided having a housing, a plurality of planetary gear sets, a structural member, a sprocket member, an annular drum, a band, and an actuator. The structural member is secured to the housing and includes an anchor portion and an actuator portion. The anchor portion defines an anchor bore and the actuator portion defines an actuator cavity. The sprocket member is rotationally supported by the structural member. The annular drum is adjacent the structural member and includes a braking portion that circumscribes one of the plurality of planetary gear sets. The annular drum is continuously rotationally coupled with a member of the one of the plurality of planetary gear sets. The band circumscribes the annular drum and includes an anchor portion and an actuating portion. The anchor portion is disposed in the anchor bore of the structural member and the band includes at least a first position and a second position. In the first position the band is substantially separated from the drum and in the second position the band contacts the drum. The actuator includes a body and a piston. The body is disposed in the actuator portion of the structural member and the piston is engaged with the actuation portion of the band clutch to selectively position the band between at least the first position and the second position to transfer torque between the structural member and the annular drum.

In another embodiment of the present invention, the band is a double wrap band clutch band.

In yet another embodiment of the present invention, the structural member is cast iron and the anchor portion and actuator portion are integrally formed with the structural member.

In yet another embodiment of the present invention, the anchor portion of the band is a pin.

In yet another embodiment of the present invention, the drum further includes a first portion and a second portion. The first portion is substantially cylindrically shaped and the second portion extends radially outward from the first portion.

In yet another embodiment of the present invention, the structural member includes a first portion and a second portion. The first portion supports the sprocket member and circumscribes the first portion of the drum and the second portion of the structural member is substantially parallel with the second portion of the drum.

In yet another embodiment of the present invention, the transmission further includes a rotational bearing disposed between the annular drum and the structural member.

In yet another embodiment of the present invention, the plurality of planetary gear sets includes a first planetary gear set, a second planetary gear set, a third planetary gear set, and a fourth planetary gear set.

In yet another embodiment of the present invention, the transmission further includes an input member, an output member, first through fifth interconnecting members, and first through sixth torque transmitting mechanisms. The first interconnecting member continuously interconnects the first member of the first planetary gear set with the second member of the second planetary gear set. The second interconnecting member continuously interconnects the second member of the first planetary gear set with the third member of the third planetary gear set. The third interconnecting member continuously interconnects the third member of the first planetary gear set with the third member of the fourth planetary gear set. The fourth interconnecting member continuously interconnects the first member of the second planetary gear set with the second member of the fourth planetary gear set. The fifth interconnecting member continuously interconnects the third member of the second planetary gear set with the second member of the third planetary gear set. The first torque transmitting mechanism is selectively engageable to interconnect the first member of the third planetary gear set with the input member, the first member of the second planetary gear set and the second member of the fourth planetary gear set. The second torque transmitting mechanism is selectively engageable to interconnect the third member of the second planetary gear set and the second member of the third planetary gear set with the input member, the first member of the second planetary gear set and the second member of the fourth planetary gear set. The third torque transmitting mechanism is selectively engageable to interconnect the first member of the third planetary gear set with the housing. The fourth torque transmitting mechanism is selectively engageable to interconnect the second member of the third planetary gear set and the third member of the second planetary gear set with the housing. The annular drum, the band, and the actuator form the fifth torque transmitting mechanism that is selectively engageable to interconnect the third member of the first planetary gear set and the third member of the fourth planetary gear set with the structural member. The sixth torque transmitting mechanism is selectively engageable to interconnect the first member of the fourth planetary gear set with the housing. The torque transmitting mechanisms are selectively engageable in combinations of at least two to establish at least ten forward speed ratios and at least one reverse speed ratio between the input member and the output member.

In yet another embodiment of the present invention, the input member is continuously connected for common rotation with the first member of the second planetary gear set and the second member of the fourth planetary gear set.

In yet another embodiment of the present invention, the output member is continuously connected for common rotation with the second member of the first planetary gear set and to third member of the third planetary gear set.

In yet another embodiment of the present invention, the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

In yet another embodiment of the present invention, the transmission further includes a seventh torque transmitting mechanism selectively engageable to interconnect the second member of the third planetary gear set and the third member of the second planetary gear set with the third member of the third planetary gear set and the second member of the first planetary gear set. The torque transmitting mechanisms are selectively engageable in combinations of at least two to establish at least twelve forward speed ratios and at least one reverse speed ratio between the input member and the output member.

In yet another embodiment of the present invention, the transmission further includes a seventh torque transmitting mechanism selectively engageable to interconnect the first member of the third planetary gear set with the second member of the third planetary gear set. The torque transmitting mechanisms are selectively engageable in combinations of at least two to establish at least twelve forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
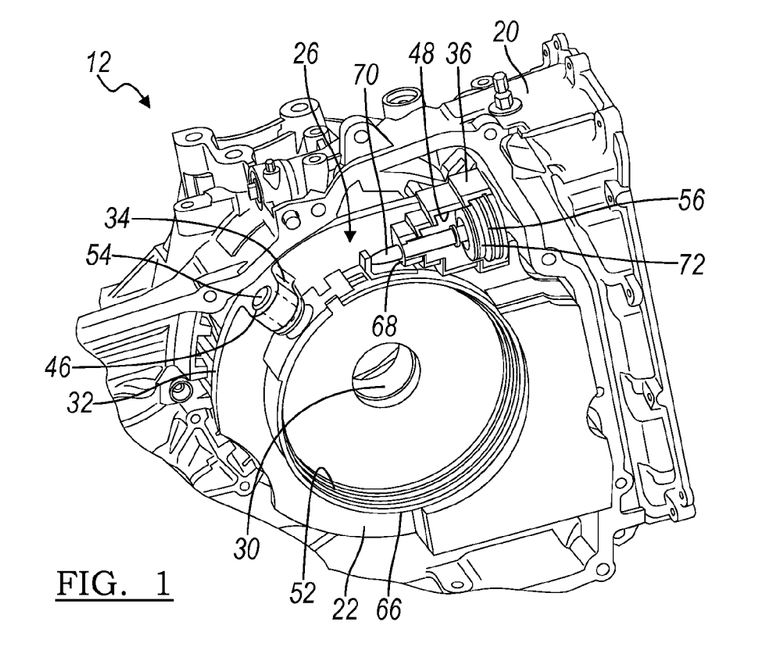
FIG. 1 is a cutaway view of a transmission that incorporates a band clutch according to the present invention.
Figure 2:
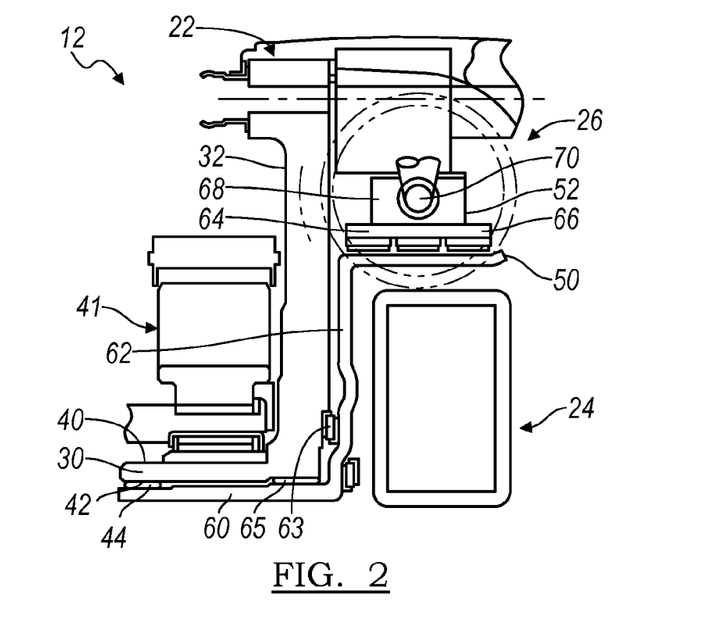
FIG. 2 is a cross section view of the transmission of FIG. 1.

Referring now to FIGS. 1 and 2, a portion of an embodiment of a transmission 12 is illustrated. The transmission 12 includes a housing 20, a support member 22, a plurality of planetary gear sets 24, and a band clutch assembly 26. The housing 20 generally surrounds and encloses components of the transmission 12 including the planetary gear sets 24. The housing 20 is preferably a lightweight but durable material such as aluminum.

The support member 22 includes a cylindrical portion 30, a disc portion 32, an anchor portion 34, and a servo pocket portion 36. In the example provided, the support member 22 is a cast iron member that is secured to the housing 20. The cylindrical portion 30 includes an outer radial surface 40 and an inner radial surface 42. The outer radial surface 40 rotationally supports a sprocket 41 and the inner radial surface 42 is engaged with at least one bearing 44. The disc portion 32 extends outward from the cylindrical portion 30 and is substantially planar in shape. The anchor portion 34 extends from the disc portion 32 and defines a pin bore 46 for supporting a band, as will be described below. The servo pocket portion 36 extends from the disc portion 32 and defines a cavity 48 shaped to mount a servo, as will be described below.

The band clutch assembly 26 includes a drum 50, a band 52, an anchor pin 54, and a servo assembly 56. The drum 50 is generally annular in shape and includes a first portion 60, a second portion 62, and a third portion 64. The first portion 60 is disposed radially inward of the cylindrical portion 30 of the support member 22. The second portion 62 is substantially disc shaped and is disposed parallel to the disc portion 32 of the support member 22. A bearing 63 is disposed between the second portion 62 of the drum 50 and the disc portion 32 of the support member 22 to resist axial forces between the drum 50 and the support member 22. The band 52 is rotationally fixed to a component of one of the planetary gear sets 24 through splines 65. The band 52 includes a band portion 66 and an actuation portion 68. The band portion 66 circumscribes the third portion 64 of the drum 50. The actuation portion 68 projects radially outward from the band portion 66 to receive a tangential actuation force from the servo assembly 56. In the example provided, the band 52 is a double wrap band. The anchor pin 54 is attached to the band portion 66 of the band 52 opposite the actuation portion 68. The anchor pin 54 is disposed in the pin bore 46 of the anchor portion 34 of the support member 22. The servo assembly 56 is disposed in the servo pocket portion 36 of the support member 22 and includes a piston 70 and an actuator 72. The piston 70 opposes the actuation portion 68 of the band 52 and the actuator selectively extends and retracts the piston 70.

With continued reference to FIGS. 1 and 2, the operation of the band clutch assembly 26 will now be described. The transmission 12 commands the actuator 72 to extend the piston 70 of the servo assembly 56 when a component fixed to the drum 50 is to be braked. The piston 70 translates the actuation portion 68 of the band 52 to tighten the band portion 66 around the drum 50. The pocket portion 36 of the support member 22 provides a reaction force to the servo assembly 56 against the actuation portion 68 of the band 52. The anchor portion 34 of the support member 22 provides a reaction force to the anchor pin 54 against braking load forces from the band portion 66. Friction forces between the band portion 66 and the drum 50 restrict rotation of the planetary gear set component through the splines 65.

Figure 3:
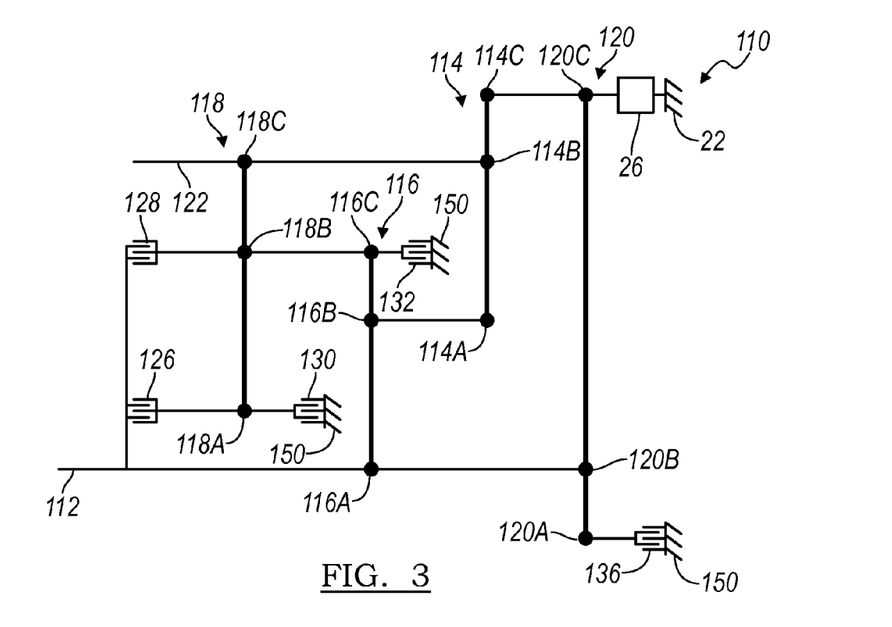
FIG. 3 is a lever diagram of an embodiment of a transmission incorporating a band clutch according to the present invention.

Referring now to FIG. 3, an embodiment of a transmission 110 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 110 includes an input shaft or member 112, a first planetary gear set 114, a second planetary gear set 116, a third planetary gear set 118 and a fourth planetary gear set 120 and an output shaft or member 122. In the lever diagram of FIG. 3, the first planetary gear set 114 has three nodes: a first node 114A, a second node 114B and a third node 114C. The second planetary gear set 116 has three nodes: a first node 116A, a second node 116B and a third node 116C. The third planetary gear set 118 has three nodes: a first node 118A, a second node 118B and a third node 118C. The fourth planetary gear set 120 has three nodes: a first node 120A, a second node 120B and a third node 120C.

The input member 112 is continuously coupled to the first node 116A of the second planetary gear set 116 and the second node 120B of the fourth planetary gear set 120. The output member 122 is coupled to the third node 118C of the third planetary gear set 118 and the second node 114B of the first planetary gear set 114. The first node 114A of the first planetary gear set 114 is coupled to the second node 116B of the second planetary gear set 116. The second node 114B of the first planetary gear set 114 is coupled to the third node 118C of the third planetary gear set 118. The third node 114C of the first planetary gear set 114 is coupled to the third node 120C of the fourth planetary gear set 120. The third node 116C of the second planetary gear set 116 is coupled to second node 118B of the third planetary gear set 118. The coupled members are directly continuously coupled to each other as indicated above.

A first clutch 126 selectively connects the input member or shaft 112, the first node 116A of the second planetary gear set 116 and the second node 120B of the fourth planetary gear set 120 with the first node 118A of the third planetary gear set 118. A second clutch 128 selectively connects the input member or shaft 112, the first node 116A of the second planetary gear set 116 and the second node 120B of the fourth planetary gear set 120 with the second node 118B of the third planetary gear set 118. A first brake 130 selectively connects the first node 118A of the third planetary gear set 118 with a stationary member or transmission housing 150. A second brake 132 selectively connects the third node 116C of the second planetary gear set 116 and the second node 118B of the third planetary gear set 118 with the stationary member or transmission housing 150. The band clutch assembly 26 as shown in FIG. 1 and FIG. 2 is a third brake that selectively connects the third node 114C of the first planetary gear set 114 and the third node 120C of the fourth planetary gear set 120 with the support member 22 as described for FIG. 1 and FIG. 2. A fourth brake 136 selectively connects the first node 120A of the fourth planetary gear set 120 with the stationary member or transmission housing 150.

Figure 4:
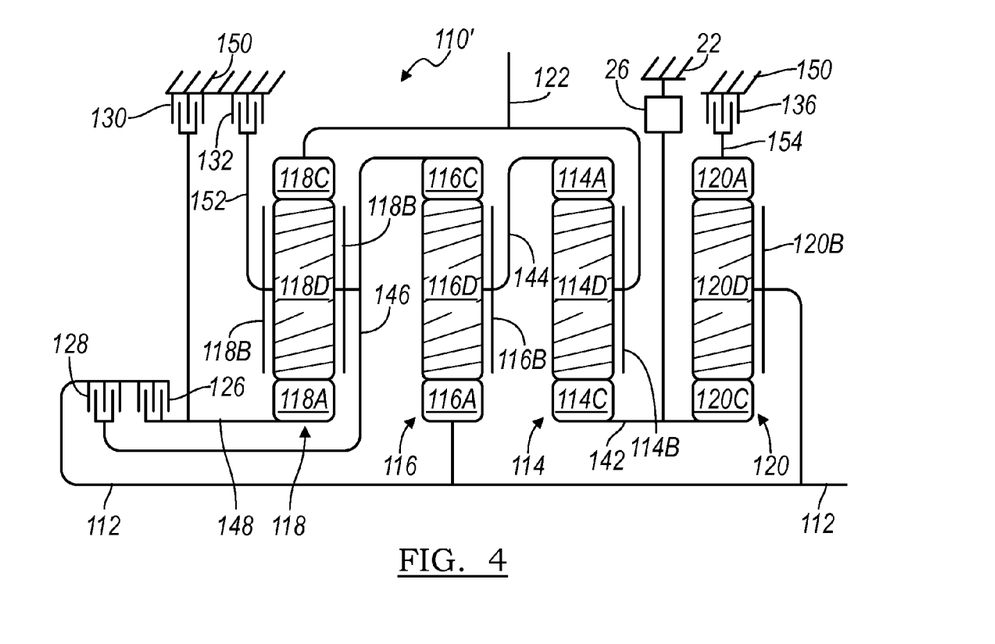
FIG. 4 is a diagrammatic illustration of an embodiment of a transmission incorporating a band clutch according to the present invention.

Referring now to FIG. 4, a stick diagram presents a schematic layout of an embodiment of the ten speed transmission 110' according to the present invention. In FIG. 4, the numbering from the lever diagram of FIG. 3 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142. The ring gear member 114A is connected for common rotation with a second shaft or interconnecting member 144. The planet carrier member 114B is connected for common rotation with the output shaft or member 122. The planet gears 114D are each configured to intermesh with both the sun gear member 114C and the ring gear member 114A.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with the input shaft or member 112. The ring gear member 116C is connected for common rotation with a third shaft or interconnecting member 146. The planet carrier member 116B is connected for common rotation with the second shaft or interconnecting member 144. The planet gears 116D are each configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with a fourth shaft or interconnecting member 148. The ring gear member 118C is connected for common rotation with the output shaft or member 122. The planet carrier member 118B is connected for common rotation with the third shaft or interconnecting member 146 and a fifth shaft or interconnecting member 152. The planet gears 118D are each configured to intermesh with both the sun gear member 118A and the ring gear member 118C.

The planetary gear set 120 includes a sun gear member 120C, a ring gear member 120A and a planet gear carrier member 120B that rotatably supports a set of planet gears 120D (only one of which is shown). The sun gear member 120C is connected for common rotation with the first shaft or interconnecting member 142. The ring gear member 120A is connected for common rotation with a sixth shaft or interconnecting member 154. The planet carrier member 120B is connected for common rotation with the input shaft or member 112. The planet gears 120D are each configured to intermesh with both the sun gear member 120C and the ring gear member 120A.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126, 128 and brakes 130, 132, 26 and 136 allow for selective interconnection of the shafts or interconnecting members, members of the planetary gear sets and the housing or support member 22. For example, the first clutch 126 is selectively engageable to connect the input shaft or member 112 with the fourth shaft or interconnecting member 148. The second clutch 128 is selectively engageable to connect the input shaft or member 112 with the third shaft or interconnecting member 146. The first brake 130 is selectively engageable to connect the fourth shaft or interconnecting member 148 with the stationary element or the transmission housing 150 in order to restrict the member 148 from rotating relative to the transmission housing 150. The second brake 132 is selectively engageable to connect the fifth shaft or interconnecting member 152 with the stationary element or the transmission housing 150 in order to restrict the member 152 from rotating relative to the transmission housing 150. The third brake or band clutch assembly 26 is selectively engageable to connect the first shaft or interconnecting member 142 with the support member 22 in order to restrict the member 142 from rotating relative to the transmission housing 150. The fourth brake 136 is selectively engageable to connect the sixth shaft or interconnecting member 154 with the stationary element or the transmission housing 150 in order to restrict the member 154 from rotating relative to the transmission housing 150.

Figure 5:
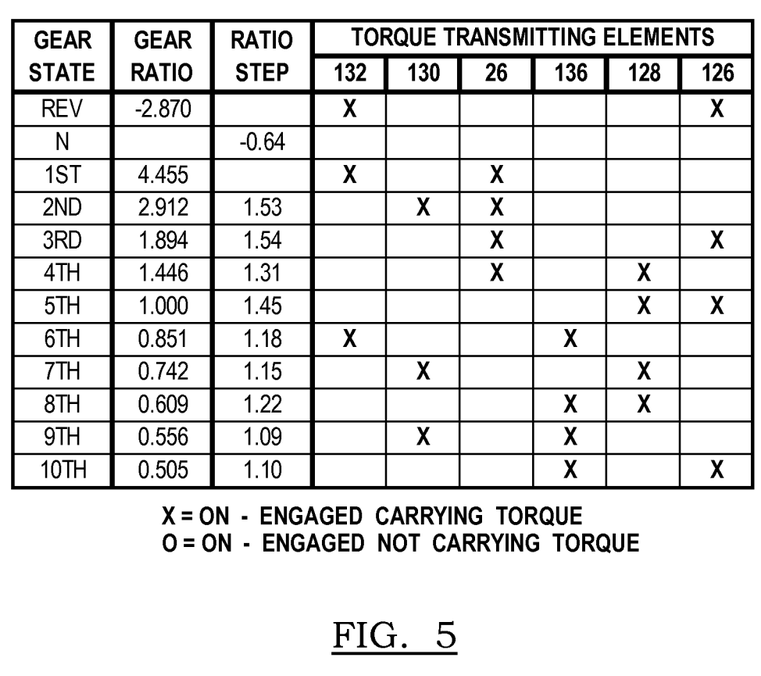
FIG. 5 is a truth table presenting the state of engagement of the various torque transmitting elements in each of the available forward and reverse speeds or gear ratios of the transmissions illustrated in FIGS. 3-4.

Referring now to FIG. 4 and FIG. 5, the operation of the embodiment of the ten speed transmission 110' will be described. It will be appreciated that transmission 110' is capable of transmitting torque from the input shaft or member 112 to the output shaft or member 122 in at least ten forward speed torque ratios and at least one reverse speed or torque ratio. Each forward and reverse speed or torque ratio is attained by engagement of one or more of the torque-transmitting mechanisms (i.e. first clutch 126, second clutch 128, first brake 130, second brake 132, third brake or band clutch assembly 26, and fourth brake 136), as will be explained below. FIG. 5 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 110'. Of course, other gear ratios are achievable depending on the gear diameter, gear teeth count and gear configuration selected.

For example to establish a reverse gear, first clutch 126 and second brake 132 are engaged or activated. The first clutch 126 connects the input shaft or member 112 with the fourth shaft or interconnecting member 148. The second brake 132 connects the fifth shaft or interconnecting member 152 with the stationary element or the transmission housing 150 in order to restrict the member 152 from rotating relative to the transmission housing 150. Likewise, the ten forward ratios are achieved through different combinations of clutch and brake engagement, as shown in FIG. 5.

It will be appreciated that the foregoing explanation of operation and gear states of the ten speed transmission 110' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 6:
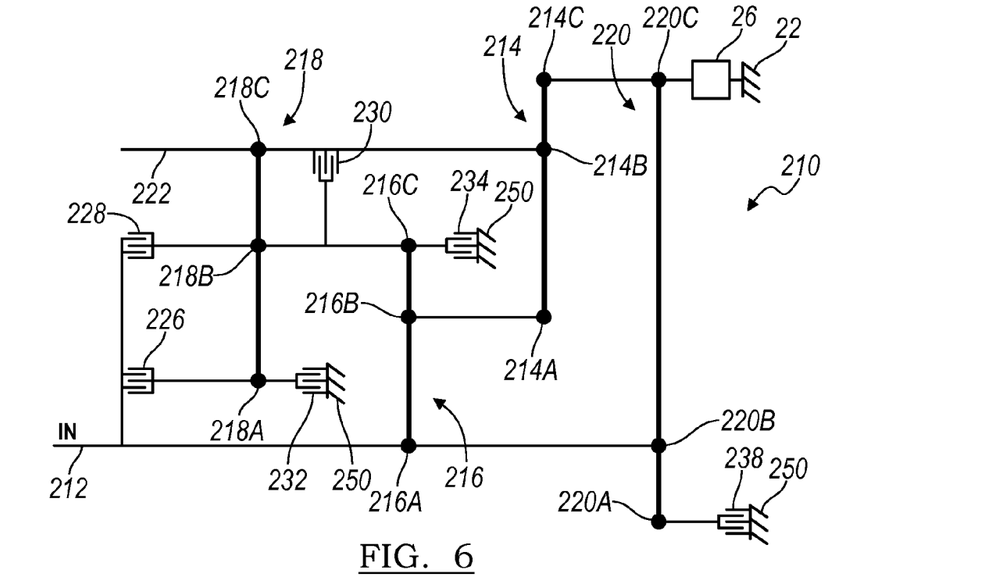
FIG. 6 is a lever diagram of an embodiment of a transmission incorporating a band clutch according to the present invention.

Referring now to FIG. 6, an embodiment of a twelve speed transmission 210 is illustrated in a lever diagram format. The transmission 210 includes an input shaft or member 212, a first planetary gear set 214, a second planetary gear set 216, a third planetary gear set 218, a fourth planetary gear set 220, and an output shaft or member 222. In the lever diagram of FIG. 6, the first planetary gear set 214 has three nodes: a first node 214A, a second node 214B, and a third node 214C. The second planetary gear set 216 has three nodes: a first node 216A, a second node 216B and a third node 216C. The third planetary gear set 218 has three nodes: a first node 218A, a second node 218B and a third node 218C. The fourth planetary gear set 220 has three nodes: a first node 220A, a second node 220B and a third node 220C.

The input member 212 is continuously coupled to the first node 216A of the second planetary gear set 216 and the second node 220B of the fourth planetary gear set 220. The output member 222 is continuously coupled to the third node 218C of the third planetary gear set 218 and the second node 214B of the first planetary gear set 214.

The first node 214A of the first planetary gear set 214 is coupled to the second node 216B of the second planetary gear set 216. The second node 214B of the first planetary gear set 214 is coupled to the third node 218C of the third planetary gear set 218. The third node 214C of the first planetary gear set 214 is coupled to the third node 220C of the fourth planetary gear set 220.

The first node 216A of the second planetary gear set 216 is coupled to the second node 220B of the fourth planetary gear set 220. The third node 216C of the second planetary gear set 216 is coupled to second node 218B of the third planetary gear set 218.

A first clutch 226 selectively connects the input member or shaft 212, the first node 216A of the second planetary gear set 216, and the second node 220B of the fourth planetary gear set 220 with the first node 218A of the third planetary gear set 218. A second clutch 228 selectively connects the input member or shaft 212, the first node 216A of the second planetary gear set 216, and the second node 220B of the fourth planetary gear set 220 with the second node 218B of the third planetary gear set 218 and the third node 216C of the second planetary gear set 216. A third clutch 230 selectively connects the output member or shaft 222, the third node 218C of the third planetary gear set 218, and the second node 214B of the first planetary gear set 214 with the third node 216C of the second planetary gear set 216 and the second node 218B of the third planetary gear set 218.

A first brake 232 selectively connects the first node 218A of the third planetary gear set 218 with a stationary member or transmission housing 250. A second brake 234 selectively connects the third node 216C of the second planetary gear set 216 and the second node 218B of the third planetary gear set 218 with the stationary member or transmission housing 250. The band clutch assembly 26 as described above is a third brake that selectively connects the third node 214C of the first planetary gear set 214 and the third node 220C of the fourth planetary gear set 220 with the support member 22. A fourth brake 238 selectively connects the first node 220A of the fourth planetary gear set 220 with the stationary member or transmission housing 250.

Figure 7:
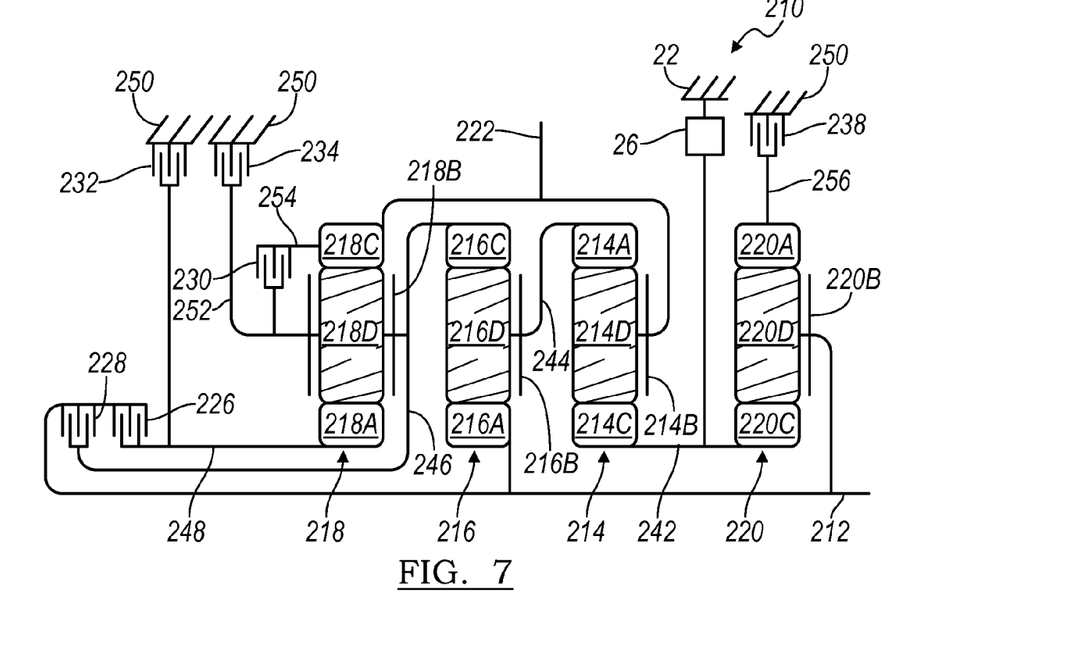
FIG. 7 is a diagrammatic illustration of an embodiment of a transmission incorporating a band clutch according to the present invention.

Referring now to FIG. 7, a stick diagram presents a schematic layout of an embodiment of the twelve speed transmission 210 according to one form of the present invention. In FIG. 7, the numbering from the lever diagram of FIG. 6 is carried over. The clutches and couplings are correspondingly presented whereas the nodes of the planetary gear sets now appear as components of planetary gear sets such as sun gears, ring gears, planet gears and planet gear carriers.

For example, the first planetary gear set 214 includes a first sun gear member 214C, a first ring gear member 214A, and a first planet gear carrier member 214B that rotatably supports a first set of planet gears 214D (only one of which is shown). The first planetary gear set 214 is a simple planetary gear set in this variation, but in other variations of the present invention, the first planetary gear set 214 could be a compound planetary gear set. The first sun gear member 214C is connected for common rotation with a first shaft or interconnecting member 242. The first ring gear member 214A is connected for common rotation with a second shaft or interconnecting member 244. The first planet carrier member 214B is connected for common rotation with the output shaft or member 222. The first planet gears 214D are each configured to intermesh with both the first sun gear member 214C and the first ring gear member 214A.

The second planetary gear set 216 includes a second sun gear member 216A, a second ring gear member 216C, and a second planet gear carrier member 216B that rotatably supports a second set of planetary gears 216D (only one of each is shown). The second planetary gear set 216 is a simple planetary gear set in this variation, but in other variations of the present invention, the second planetary gear set 216 could be a compound planetary gear set having more than one set of planetary gears supported by the carrier member 216B. The second sun gear member 216A is connected for common rotation with the input shaft or member 212. The second planet carrier member 216B is connected for common rotation with the second shaft or interconnecting member 244. The second ring gear member 216C is connected for common rotation with a third shaft or interconnecting member 246. The second set of planet gears 216D is configured to intermesh with both the second ring gear member 216C and the second sun gear member 216A.

The third planetary gear set 218 includes a third sun gear member 218A, a third ring gear member 218C, and a third planet gear carrier member 218B that rotatably supports a third set of planet gears 218D (only one of which is shown). In other words, the third planetary gear set 218 is a simple planetary gear set in this variation, but in other variations of the present invention, the third planetary gear set 218 could be a compound planetary gear set. The third sun gear member 218A is connected for common rotation with a fourth shaft or interconnecting member 248. The third planet carrier member 218B is connected for common rotation with the third shaft or interconnecting member 246 and a fifth shaft or interconnecting member 252. The third ring gear member 218C is connected for common rotation with the output shaft or member 222. In addition, the third ring gear member 218C is connected for common rotation with a sixth shaft or interconnecting member 254. The third planet gears 218D are each configured to intermesh with both the third sun gear member 218A and the third ring gear member 218C.

The fourth planetary gear set 220 includes a fourth sun gear member 220C, a fourth ring gear member 220A, and a fourth planet gear carrier member 220B that rotatably supports a fourth set of planet gears 220D (only one of which is shown). In other words, the fourth planetary gear set 220 is a simple planetary gear set in this variation, but in other variations of the present invention, the fourth planetary gear set 220 could be a compound planetary gear set. The fourth sun gear member 220C is connected for common rotation with the first shaft or interconnecting member 242. The fourth ring gear member 220A is connected for common rotation with a seventh shaft or interconnecting member 256. The fourth planetary gear carrier member 220B is connected for common rotation with the input shaft or member 212. The fourth planet gears 220D are each configured to intermesh with both the fourth sun gear member 220C and the fourth ring gear member 220A.

The input shaft or member 212 is continuously connected to an input source, such as an engine (not shown) or a turbine of a torque converter (not shown). The output shaft or member 222 is continuously connected with another output such as the final drive unit or transfer case (not shown).

The first clutch 226 is selectively engageable to connect the input shaft or member 212 with the fourth shaft or interconnecting member 248. The second clutch 228 is selectively engageable to connect the input shaft or member 212 with the third shaft or interconnecting member 246. The third clutch 230 is selectively engageable to connect the fifth shaft or interconnecting member 252 with the sixth shaft or interconnecting member 254.

The first brake 232 is selectively engageable to connect the fourth shaft or interconnecting member 248 with the stationary element or the transmission housing 250 in order to restrict the member 248 from rotating relative to the transmission housing 250. The second brake 234 is selectively engageable to connect the fifth shaft or interconnecting member 252 with the stationary element or the transmission housing 250 in order to restrict the member 252 from rotating relative to the transmission housing 250. The third brake or band clutch assembly 26 is selectively engageable to connect the first shaft or interconnecting member 242 with the support member 22 in order to restrict the member 242 from rotating relative to the support member 22 and transmission housing 250. The fourth brake 238 is selectively engageable to connect the seventh shaft or interconnecting member 256 with the stationary element or the transmission housing 250 in order to restrict the member 256 from rotating relative to the transmission housing 250. In turn, the gear elements connected to each of the connecting members are also connected or restricted accordingly.

Figure 8:
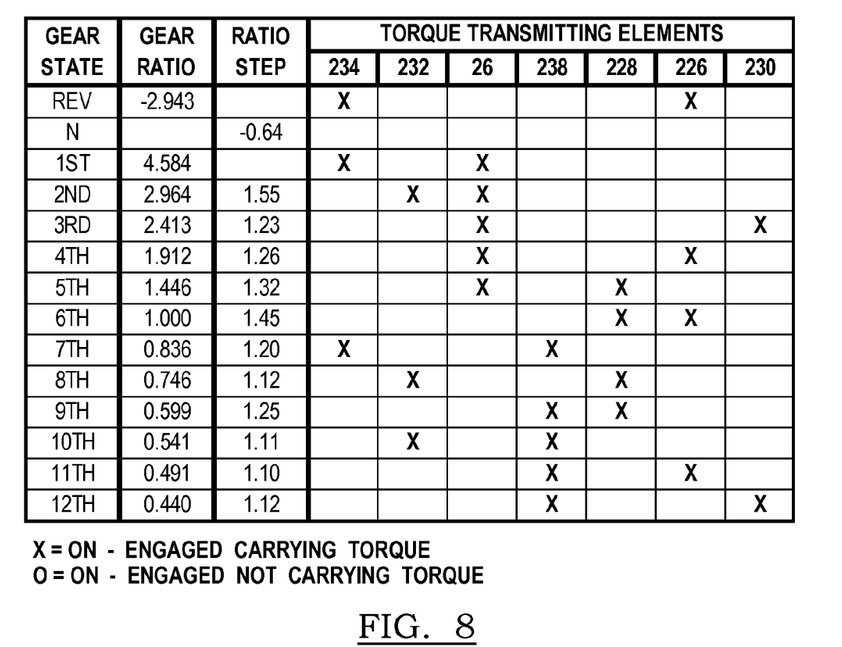
FIG. 8 is a truth table presenting the state of engagement of the various torque transmitting elements in each of the available forward and reverse speeds or gear ratios of the transmissions illustrated in FIGS. 6-7.

Referring now to FIG. 7 and FIG. 8, the operation of the embodiment of the transmission 210 will be described. It will be appreciated that transmission 210 is capable of transmitting torque from the input shaft or member 212 to the output shaft or member 222 in eleven, twelve, or more forward speed torque ratios and at least one reverse speed or torque ratio. Each forward and reverse speed or torque ratio is attained by engagement of one or more of the torque-transmitting mechanisms (i.e. first clutch 226, second clutch 228, third clutch 230, first brake 232, second brake 234, third brake or band clutch assembly 26, and fourth brake 238), as will be explained below.

Like FIG. 5, FIG. 8 is a truth table presenting the various combinations of torque-transmitting mechanisms that are activated or engaged to achieve the various gear states, except that FIG. 8 corresponds to the transmission 210 of FIGS. 6-7 instead of the transmission 110 of FIGS. 3-4. To establish a reverse gear, the first clutch 226 and the second brake 234 are engaged or activated. The first clutch 226 connects the input shaft or member 212 with the fourth shaft or interconnecting member 248. The second brake 234 connects the fifth shaft or interconnecting member 252 with the stationary element or the transmission housing 250 in order to restrict the member 252 from rotating relative to the transmission housing 250, which restricts the third planetary carrier member 218B and the second ring gear member 216C from rotating relative to the transmission housing 250. Likewise, twelve forward ratios are achieved through different combinations of clutch and brake engagement, as shown in FIG. 8, by way of example.

Figure 9:
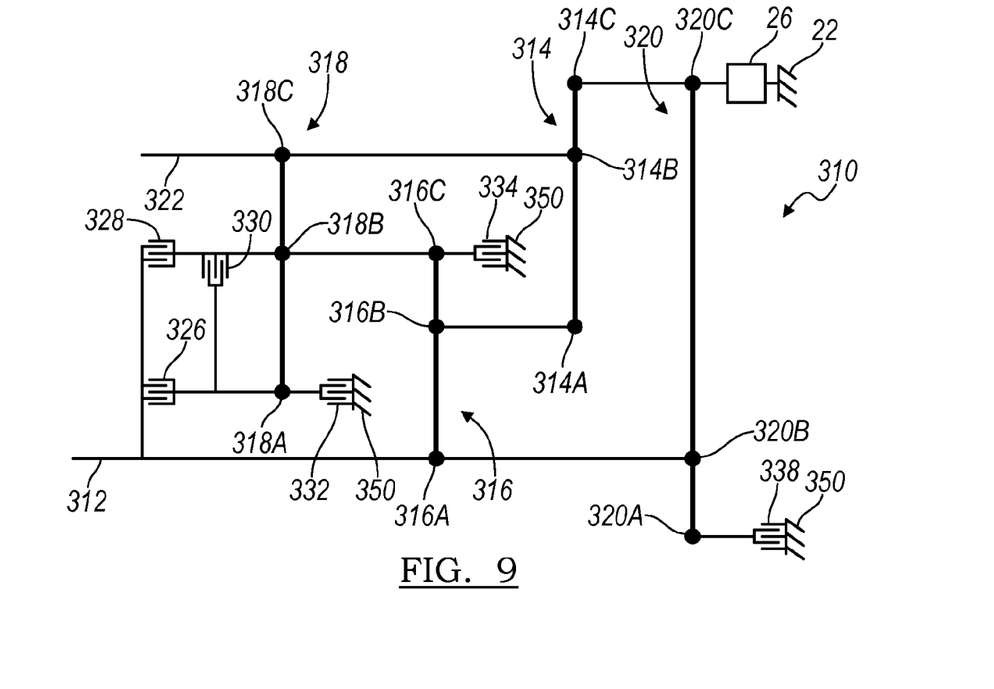
FIG. 9 is a lever diagram of an embodiment of a transmission incorporating a band clutch according to the present invention.

Referring now to FIG. 9, another embodiment of a twelve speed transmission 310 is illustrated in a lever diagram format. The transmission 310 includes an input shaft or member 312, a first planetary gear set 314, a second planetary gear set 316, a third planetary gear set 318, a fourth planetary gear set 320, and an output shaft or member 322. Like the lever diagram of FIG. 6, in the lever diagram of FIG. 9, each of the planetary gear sets 314, 316, 318, 320 have first, second, and third nodes 314A-C, 316A-C, 318A-C, 320A-C.

The input member 312 is continuously coupled to the first node 316A of the second planetary gear set 316 and the second node 320B of the fourth planetary gear set 320. The output member 322 is continuously coupled to the third node 318C of the third planetary gear set 318 and the second node 314B of the first planetary gear set 314. The first node 314A of the first planetary gear set 314 is coupled to the second node 316B of the second planetary gear set 316. The second node 314B of the first planetary gear set 314 is coupled to the third node 318C of the third planetary gear set 318. The third node 314C of the first planetary gear set 314 is coupled to the third node 320C of the fourth planetary gear set 320.

The first node 316A of the second planetary gear set 316 is coupled to the second node 320B of the fourth planetary gear set 320. The third node 316C of the second planetary gear set 316 is coupled to second node 318B of the third planetary gear set 318.

A first clutch 326 selectively connects the input member or shaft 312, the first node 316A of the second planetary gear set 316, and the second node 320B of the fourth planetary gear set 320 with the first node 318A of the third planetary gear set 318. A second clutch 328 selectively connects the input member or shaft 312, the first node 316A of the second planetary gear set 316, and the second node 320B of the fourth planetary gear set 320 with the second node 318B of the third planetary gear set 318 and the third node 316C of the second planetary gear set 316. A third clutch 330 selectively connects the first node 318A of the third planetary gear set 318 with the second node 318B of the third planetary gear set 318 and the third node 316C of the second planetary gear set 316.

A first brake 332 selectively connects the first node 318A of the third planetary gear set 318 with a stationary member or transmission housing 350. A second brake 334 selectively connects the third node 316C of the second planetary gear set 316 and the second node 318B of the third planetary gear set 318 with the stationary member or transmission housing 350. The band clutch assembly 26 is a third brake 336 that selectively connects the third node 314C of the first planetary gear set 314 and the third node 320C of the fourth planetary gear set 320 with the stationary member or transmission housing 350. A fourth brake 338 selectively connects the first node 320A of the fourth planetary gear set 320 with the stationary member or transmission housing 350.

Figure 10:
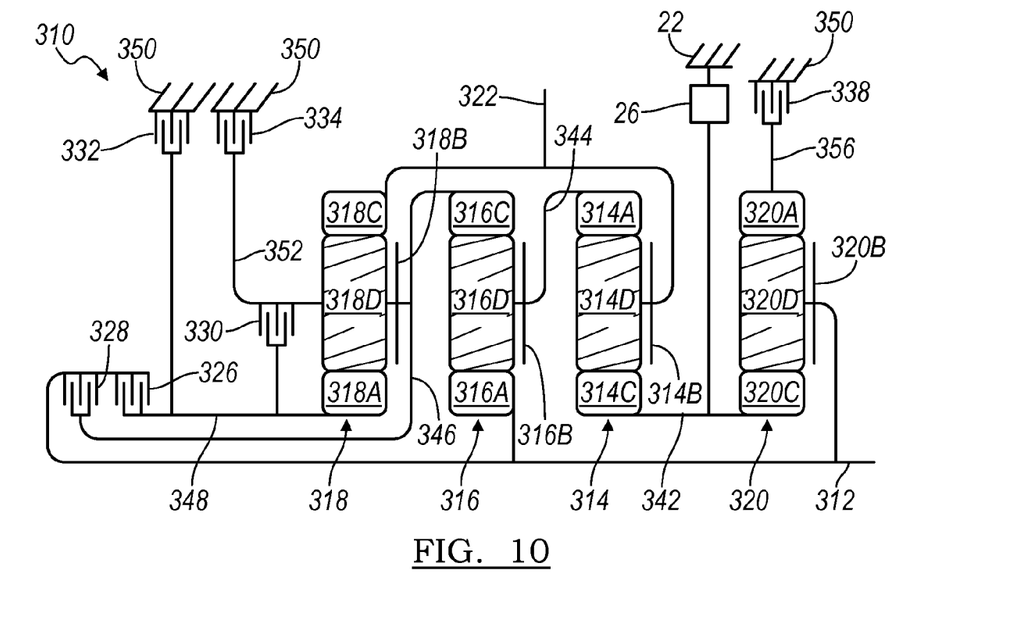
FIG. 10 is a diagrammatic illustration of an embodiment of a transmission incorporating a band clutch according to the present invention.

Referring now to FIG. 10, a stick diagram presents a schematic layout of an embodiment of the twelve speed transmission 310 of FIG. 9, according to one form of the present invention. It should be understood that alternatively, other different stick diagrams could be used in conjunction with the lever diagram FIG. 9. In FIG. 10, the numbering from the lever diagram of FIG. 9 is carried over. The clutches and couplings are correspondingly presented whereas the nodes of the planetary gear sets now appear as components of planetary gear sets such as sun gears, ring gears, planet gears and planet gear carriers.

For example, like the stick diagram in FIG. 7, the stick diagram in FIG. 10 includes first, second, third, and fourth planetary gear sets 314, 316, 318, 320, wherein each includes a sun gear member 314C, 316A, 318A, 320C, a planet carrier member 314B, 316B, 318B, 320B having planet gears 314D, 316D, 318D, 320D, and a ring gear member 314A, 316C, 318C, 320A. The planet gears 314D, 316D, 318D, 320D intermesh with both a sun gear member 314C, 316A, 318A, 320C and a ring gear member 314A, 316C, 318C, 320A, respectively. Each of the planetary gear sets 314, 316, 318, 320 are simple planetary gear sets in this variation, but in other variations of the present invention, one or more of the planetary gear sets 314, 316, 318, 320 could be compound planetary gear sets. The input shaft or member 312 is continuously connected to an input source, and the output shaft or member 322 is continuously connected with another output.

The first sun gear member 314C is connected for common rotation with a first shaft or interconnecting member 342. The first ring gear member 314A is connected for common rotation with a second shaft or interconnecting member 344. The first planet carrier member 314B is connected for common rotation with the output shaft or member 322.

The second sun gear member 316A is connected for common rotation with the input shaft or member 312. The second planet carrier member 316B is connected for common rotation with the second shaft or interconnecting member 344. The second ring gear member 316C is connected for common rotation with a third shaft or interconnecting member 346.

The third sun gear member 318A is connected for common rotation with a fourth shaft or interconnecting member 348. The third ring gear member 318C is connected for common rotation with the output shaft or member 322. The third planet carrier member 318B is connected for common rotation with the third shaft or interconnecting member 346 and a fifth shaft or interconnecting member 352.

The fourth sun gear member 320C is connected for common rotation with the first shaft or interconnecting member 342. The fourth ring gear member 320A is connected for common rotation with a sixth shaft or interconnecting member 356. The fourth planetary gear carrier member 320B is connected for common rotation with the input shaft or member 312.

The first clutch 326 is selectively engageable to connect the input shaft or member 312 with the fourth shaft or interconnecting member 348. The second clutch 328 is selectively engageable to connect the input shaft or member 312 with the third shaft or interconnecting member 346. The third clutch 330 is selectively engageable to connect the fifth shaft or interconnecting member 352 with the fourth shaft of interconnecting member 348.

The first brake 332 is selectively engageable to connect the fourth shaft or interconnecting member 348 with the stationary element or the transmission housing 350. The second brake 334 is selectively engageable to connect the fifth shaft or interconnecting member 352 with the stationary element or the transmission housing 350. The third brake or band clutch assembly 26 is selectively engageable to connect the first shaft or interconnecting member 342 with the stationary element or the transmission housing 350. The fourth brake 338 is selectively engageable to connect the sixth shaft or interconnecting member 356 with the stationary element or the transmission housing 350.

Referring now to FIGS. 9-10, the operation of the illustrated embodiment of the transmission 310 will be described. The transmission 310 is capable of transmitting torque from the input shaft or member 312 to the output shaft or member 322 in eleven, twelve, or more forward speed torque ratios and at least one reverse speed or torque ratio. Each forward and reverse speed or torque ratio is attained by engagement of one or more of the torque-transmitting mechanisms (i.e. first clutch 326, second clutch 328, third clutch 330, first brake 332, second brake 334, third brake or band clutch assembly 26, and fourth brake 338), as will be explained below.

Figure 11:
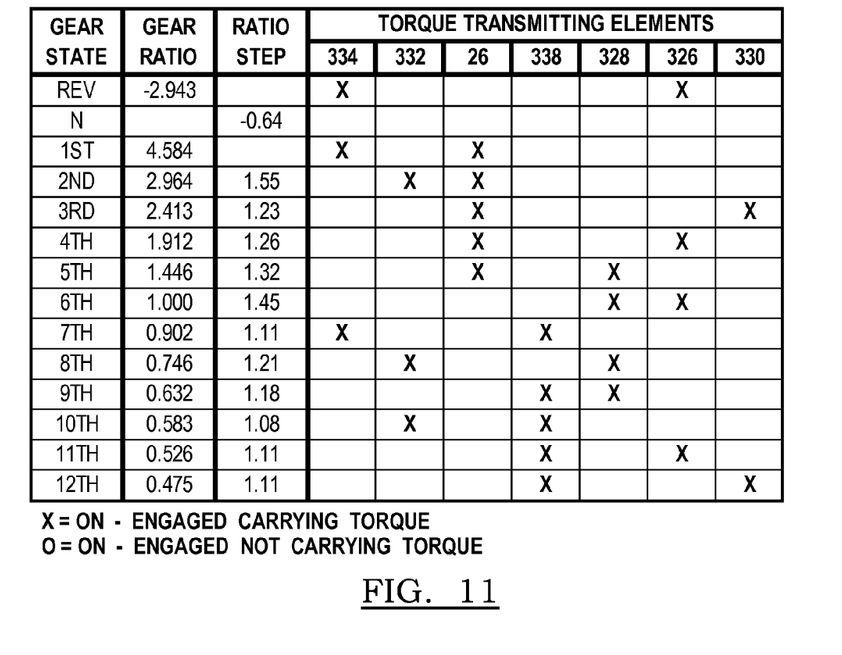
FIG. 11 is a truth table presenting the state of engagement of the various torque transmitting elements in each of the available forward and reverse speeds or gear ratios of the transmissions illustrated in FIGS. 9-10.

Like FIG. 8, FIG. 11 is a truth table presenting the various combinations of torque-transmitting mechanisms that are activated or engaged to achieve the various gear states, except that FIG. 11 corresponds to the transmission 310 of FIGS. 9-10 instead of the transmission 210 of FIGS. 6-7. Actual numerical gear ratios of the various gear states are also presented although it should be appreciated that these numerical values are exemplary only and that they may be adjusted over significant ranges to accommodate various applications and operational criteria of the transmission 310. Of course, other gear ratios are achievable depending on the gear diameter, gear teeth count and gear configuration selected.

For example to establish a reverse gear, the first clutch 326 and the second brake 334 are engaged or activated. The first clutch 326 connects the input shaft or member 312 with the fourth shaft or interconnecting member 348. The second brake 334 connects the fifth shaft or interconnecting member 352 with the stationary element or the transmission housing 350 in order to restrict the member 352 from rotating relative to the transmission housing 350, which also restricts the third planetary carrier member 318B and the second ring gear member 316C from rotating relative to the transmission housing 350. Likewise, twelve forward ratios may be achieved through different combinations of clutch and brake engagement, as shown in FIG. 11.

It will be appreciated that the foregoing explanation of operation and gear states of the transmissions 210, 310 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The present invention has several beneficial features. For example, the band clutch has lower spin losses than a traditional plate clutch. The reduced spin losses promote improved fuel economy of the vehicle. Additionally, by using a structural member that is used as a sprocket support, the amount of additional parts and mass added to the transmission is reduced. Furthermore, the cast iron structural member resists stress concentrations more than an aluminum housing.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
a housing;
a plurality of planetary gear sets disposed in the housing and each including a first member, a second member, and a third member;
a structural member secured to the housing and including an anchor portion and an actuator portion, wherein the anchor portion defines an anchor bore and the actuator portion defines an actuator cavity;
a sprocket member rotationally supported by the structural member;
an annular drum adjacent the structural member and including a braking portion that circumscribes one of the plurality of planetary gear sets, wherein the annular drum is continuously rotationally coupled with a member of the one of the plurality of planetary gear sets;
a band circumscribing the annular drum and including an anchor portion and an actuating portion, wherein the anchor portion is disposed in the anchor bore of the structural member, and wherein the band includes at least a first position and a second position, and wherein in the first position the band is substantially separated from the drum and in the second position the band contacts the drum; and
an actuator including a body and a piston, wherein the body is disposed in the actuator portion of the structural member and the piston is engaged with the actuation portion of the band clutch to selectively position the band between at least the first position and the second position to transfer torque between the structural member and the annular drum.

2. The transmission of claim 1 wherein the band is a double wrap band clutch band.

3. The transmission of claim 1 wherein the housing is aluminum, the structural member is cast iron, and the anchor portion and actuator portion are integrally formed with the structural member.

4. The transmission of claim 1 wherein the anchor portion of the band is a pin.

5. The transmission of claim 1 wherein the drum further includes a first portion and a second portion, wherein the first portion is substantially cylindrically shaped and the second portion extends radially outward from the first portion.

6. The transmission of claim 5 wherein the structural member includes a first portion and a second portion, and wherein the first portion supports the sprocket member and circumscribes the first portion of the drum, and wherein the second portion of the structural member is substantially parallel with the second portion of the drum.

7. The transmission of claim 1 further including a rotational bearing disposed between the annular drum and the structural member.

8. The transmission of claim 1 wherein the plurality of planetary gear sets includes a first planetary gear set, a second planetary gear set, a third planetary gear set, and a fourth planetary gear set.

9. The transmission of claim 8 further comprising:
an input member;
an output member;
a first interconnecting member continuously interconnecting the first member of the first planetary gear set with the second member of the second planetary gear set;
a second interconnecting member continuously interconnecting the second member of the first planetary gear set with the third member of the third planetary gear set;

a third interconnecting member continuously interconnecting the third member of the first planetary gear set with the third member of the fourth planetary gear set;
a fourth interconnecting member continuously interconnecting the first member of the second planetary gear set with the second member of the fourth planetary gear set;
a fifth interconnecting member continuously interconnecting the third member of the second planetary gear set with the second member of the third planetary gear set;
a first torque transmitting mechanism selectively engageable to interconnect the first member of the third planetary gear set with the input member, the first member of the second planetary gear set and the second member of the fourth planetary gear set;
a second torque transmitting mechanism selectively engageable to interconnect the third member of the second planetary gear set and the second member of the third planetary gear set with the input member, the first member of the second planetary gear set and the second member of the fourth planetary gear set;
a third torque transmitting mechanism selectively engageable to interconnect the first member of the third planetary gear set with the housing;
a fourth torque transmitting mechanism selectively engageable to interconnect the second member of the third planetary gear set and the third member of the second planetary gear set with the housing; and
a sixth torque transmitting mechanism selectively engageable to interconnect the first member of the fourth planetary gear set with the housing, and
wherein the annular drum, the band, and the actuator form a fifth torque transmitting mechanism selectively engageable to interconnect the third member of the first planetary gear set and the third member of the fourth planetary gear set with the structural member, and
wherein the torque transmitting mechanisms are selectively engageable in combinations of at least two to establish at least ten forward speed ratios and at least one reverse speed ratio between the input member and the output member.

10. The transmission of claim 9 wherein the input member is continuously connected for common rotation with the first member of the second planetary gear set and the second member of the fourth planetary gear set.

11. The transmission of claim 9 wherein the output member is continuously connected for common rotation with the second member of the first planetary gear set and to the third member of the third planetary gear set.

12. The transmission of claim 9 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

13. The transmission of claim 9 further including a seventh torque transmitting mechanism selectively engageable to interconnect the second member of the third planetary gear set and the third member of the second planetary gear set with the third member of the third planetary gear set and the second member of the first planetary gear set, and wherein the torque transmitting mechanisms are selectively engageable in combinations of at least two to establish at least twelve forward speed ratios and at least one reverse speed ratio between the input member and the output member.

14. The transmission of claim 9 further including a seventh torque transmitting mechanism selectively engageable to interconnect the first member of the third planetary gear set with the second member of the third planetary gear set, and wherein the torque transmitting mechanisms are selectively engageable in combinations of at least two to establish at least twelve forward speed ratios and at least one reverse speed ratio between the input member and the output member.

15. A transmission comprising:
an input member;
an output member;
a housing;
first, second, third and fourth planetary gear sets disposed in the housing and each having first, second and third members;
a structural member secured to the housing and including an anchor portion and an actuator portion, wherein the anchor portion defines an anchor bore and the actuator portion defines an actuator cavity;
a sprocket member rotationally supported by the structural member;
a first interconnecting member continuously interconnecting the first member of the first planetary gear set with the second member of the second planetary gear set;
a second interconnecting member continuously interconnecting the second member of the first planetary gear set with the third member of the third planetary gear set;
a third interconnecting member continuously interconnecting the third member of the first planetary gear set with the third member of the fourth planetary gear set;
a fourth interconnecting member continuously interconnecting the first member of the second planetary gear set with the second member of the fourth planetary gear set;
a fifth interconnecting member continuously interconnecting the third member of the second planetary gear set with the second member of the third planetary gear set;
a first torque transmitting mechanism selectively engageable to interconnect the first member of the third planetary gear set with the input member, the first member of the second planetary gear set and the second member of the fourth planetary gear set;
a second torque transmitting mechanism selectively engageable to interconnect the third member of the second planetary gear set and the second member of the third planetary gear set with the input member, the first member of the second planetary gear set and the second member of the fourth planetary gear set;
a third torque transmitting mechanism selectively engageable to interconnect the first member of the third planetary gear set with the housing;
a fourth torque transmitting mechanism selectively engageable to interconnect the second member of the third planetary gear set and the third member of the second planetary gear set with the housing;
a fifth torque transmitting mechanism selectively engageable to interconnect the third member of the first planetary gear set and the third member of the fourth planetary gear set with the structural member, the fifth torque transmitting mechanism comprising:
an annular drum adjacent the structural member and including a braking portion that circumscribes one of the first and fourth planetary gear sets, wherein the annular drum is continuously rotationally coupled with the third member of the first planetary gear set and the third member of the fourth planetary gear set;

a band circumscribing the annular drum and including an anchor portion and an actuating portion, wherein the anchor portion is disposed in the anchor bore of the structural member, and wherein the band includes at least a first position and a second position, and wherein in the first position the band is substantially separated from the drum and in the second position the band contacts the drum; and an actuator including a body and a piston, wherein the body is disposed in the actuator portion of the structural member and the piston is engaged with the actuation portion of the band clutch to selectively position the band between at least the first position and the second position to transfer torque between the structural member and the annular drum; and a sixth torque transmitting mechanism selectively engageable to interconnect the first member of the fourth planetary gear set with the housing, and wherein the torque transmitting mechanisms are selectively engageable in combinations of at least two to establish at least ten forward speed ratios and at least one reverse speed ratio between the input member and the output member.

16. The transmission of claim 15 wherein the band is a double wrap band clutch band, the structural member is cast iron and the anchor portion and actuator portion are integrally formed with the structural member, the anchor portion of the band is a pin, the drum further includes a first portion and a second portion, wherein the first portion is substantially cylindrically shaped and the second portion extends radially outward from the first portion, and the structural member includes a first portion and a second portion, and wherein the first portion supports the sprocket member and circumscribes the first portion of the drum, and wherein the second portion of the structural member is substantially parallel with the second portion of the drum.

17. The transmission of claim 15 wherein the third member of the first planetary gear set, the third member of the fourth planetary gear set, the first member of the second planetary gear set and the first member of the third planetary gear set are sun gears, the second members of the first, second, third and fourth planetary gear sets are carrier members and the first member of the first planetary gear set, the first member of the fourth planetary gear set, the third member of the second planetary gear set and the third member of the third planetary gear set are ring gears.

18. The transmission of claim 15 further including a seventh torque transmitting mechanism selectively engageable to interconnect the second member of the third planetary gear set and the third member of the second planetary gear set with the third member of the third planetary gear set and the second member of the first planetary gear set, and wherein the torque transmitting mechanisms are selectively engageable in combinations of at least two to establish at least twelve forward speed ratios and at least one reverse speed ratio between the input member and the output member.

19. The transmission of claim 15 further including a seventh torque transmitting mechanism selectively engageable to interconnect the first member of the third planetary gear set with the second member of the third planetary gear set, and wherein the torque transmitting mechanisms are selectively engageable in combinations of at least two to establish at least twelve forward speed ratios and at least one reverse speed ratio between the input member and the output member.

20. A transmission comprising:
an input member;
an output member;
a housing;
first, second, third and fourth planetary gear sets disposed in the housing and each having a sun gear, a ring gear, and a carrier member;
a structural member secured to the housing and including an anchor portion and an actuator portion, wherein the anchor portion defines an anchor bore and the actuator portion defines an actuator cavity;
a sprocket member rotationally supported by the structural member;
a first interconnecting member continuously interconnecting the ring gear of the first planetary gear set with the carrier member of the second planetary gear set;
a second interconnecting member continuously interconnecting the carrier member of the first planetary gear set with the ring gear of the third planetary gear set;
a third interconnecting member continuously interconnecting the sun gear of the first planetary gear set with the sun gear of the fourth planetary gear set;
a fourth interconnecting member continuously interconnecting the sun gear of the second planetary gear set with the carrier member of the fourth planetary gear set;
a fifth interconnecting member continuously interconnecting the ring gear of the second planetary gear set with the carrier member of the third planetary gear set;
a first torque transmitting mechanism selectively engageable to interconnect the sun gear of the third planetary gear set with the input member, the sun gear of the second planetary gear set and the carrier member of the fourth planetary gear set;
a second torque transmitting mechanism selectively engageable to interconnect the ring gear of the second planetary gear set and the carrier member of the third planetary gear set with the input member, the sun gear of the second planetary gear set and the carrier member of the fourth planetary gear set;
a third torque transmitting mechanism selectively engageable to interconnect the sun gear of the third planetary gear set with the housing;
a fourth torque transmitting mechanism selectively engageable to interconnect the carrier member of the third planetary gear set and the ring gear of the second planetary gear set with the housing;
a fifth torque transmitting mechanism selectively engageable to interconnect the sun gear of the first planetary gear set and the sun gear of the fourth planetary gear set with the structural member, the fifth torque transmitting mechanism comprising:
an annular drum adjacent the structural member and including a braking portion that circumscribes one of the first and fourth planetary gear sets, wherein the annular drum is continuously rotationally coupled with the sun gear of the first planetary gear set and the sun gear of the fourth planetary gear set;
a band circumscribing the annular drum and including an anchor portion and an actuating portion, wherein the anchor portion is disposed in the anchor bore of the structural member, and wherein the band includes at least a first position and a second position, and wherein in the first position the band is substantially separated from the drum and in the second position the band contacts the drum; and
an actuator including a body and a piston, wherein the body is disposed in the actuator portion of the structural member and the piston is engaged with the actuation portion of the band clutch to selectively position the band between at least the first position and the second position to transfer torque between the structural member and the annular drum; and a sixth torque transmitting mechanism selectively engageable to interconnect the ring gear of the fourth planetary gear set with the housing, and wherein the torque transmitting mechanisms are selectively engageable in combinations of at least two to establish at least ten forward speed ratios and at least one reverse speed ratio between the input member and the output member.

21. The transmission of claim 20 further including a seventh torque transmitting mechanism selectively engageable to interconnect the carrier member of the third planetary gear set and the ring gear of the second planetary gear set with the ring gear of the third planetary gear set and the carrier member of the first planetary gear set, and wherein the torque transmitting mechanisms are selectively engageable in combinations of at least two to establish at least twelve forward speed ratios and at least one reverse speed ratio between the input member and the output member.

22. The transmission of claim 20 further including a seventh torque transmitting mechanism selectively engageable to interconnect the sun gear of the third planetary gear set with the carrier member of the third planetary gear set, and wherein the torque transmitting mechanisms are selectively engageable in combinations of at least two to establish at least twelve forward speed ratios and at least one reverse speed ratio between the input member and the output member.

* * * * *